United States Patent
Liu

(10) Patent No.: US 11,483,657 B2
(45) Date of Patent: Oct. 25, 2022

(54) HUMAN-MACHINE INTERACTION METHOD AND DEVICE, COMPUTER APPARATUS, AND STORAGE MEDIUM

(71) Applicant: Guohua Liu, Guangdong (CN)

(72) Inventor: Guohua Liu, Guangdong (CN)

(*) Notice: Subject to any disclaimer, the term of this patent is extended or adjusted under 35 U.S.C. 154(b) by 153 days.

(21) Appl. No.: 16/966,373

(22) PCT Filed: Jan. 28, 2019

(86) PCT No.: PCT/CN2019/073324
§ 371 (c)(1),
(2) Date: Jul. 30, 2020

(87) PCT Pub. No.: WO2019/149160
PCT Pub. Date: Aug. 8, 2019

(65) Prior Publication Data
US 2020/0374630 A1 Nov. 26, 2020

(30) Foreign Application Priority Data
Feb. 2, 2018 (CN) .......................... 201810108122.0

(51) Int. Cl.
*H04R 3/04* (2006.01)
*G06T 7/00* (2017.01)
(Continued)

(52) U.S. Cl.
CPC ............. *H04R 3/04* (2013.01); *G06T 7/0012* (2013.01); *G10L 15/08* (2013.01); *G10L 15/22* (2013.01);
(Continued)

(58) Field of Classification Search
CPC .......... G06F 3/011; G06F 3/0346; G06F 3/16; G06F 3/165; G06F 3/167; G06F 16/3343;
(Continued)

(56) References Cited

U.S. PATENT DOCUMENTS

| 5,949,886 A * | 9/1999 | Nevins | ..................... H03G 3/32 381/104 |
| 6,434,527 B1 * | 8/2002 | Horvitz | ..................... G06F 3/16 704/251 |

(Continued)

FOREIGN PATENT DOCUMENTS

| CN | 103198832 | 7/2013 |
| CN | 103688531 | 3/2014 |

(Continued)

OTHER PUBLICATIONS

International Search Report issued for International Patent Application No. PCT/CN2019/073324, dated Apr. 9, 2019, 5 pages including English translation.

*Primary Examiner* — Gerald Gauthier
(74) *Attorney, Agent, or Firm* — Hamre, Schumann, Mueller & Larson, P.C.

(57) ABSTRACT

The present application relates to a human-machine interaction method and device, a computer apparatus, and a storage medium. The method comprises: measuring the current output volume, and if the output volume is less than a first preset threshold, enabling a voice recognition function; acquiring a user's voice message, and measuring the size of the user's voice volume and responding to a user's voice operation; and if the user's voice volume is greater than a second preset threshold, turning down the output volume, and returning to the step of measuring the current output volume. In the entire process, the voice recognition function is controlled to be enabled by means of the output volume of an apparatus itself, thereby accurately responding to the user's voice operation, and if the user's voice is greater than a specified value, turning down the output volume, so that a user's subsequent voice message can be highlighted and accurately acquired so as to bring conve- (Continued)

nience to a user's operation and implement good human-machine interaction.

14 Claims, 4 Drawing Sheets

(51) Int. Cl.
*G10L 15/08* (2006.01)
*G10L 15/22* (2006.01)

(52) U.S. Cl.
CPC ............ *G06T 2207/30201* (2013.01); *G10L 2015/088* (2013.01); *H04R 2430/01* (2013.01)

(58) Field of Classification Search
CPC ........ G06T 7/0012; G06T 2207/30201; G06V 40/161; G10L 15/05; G10L 15/08; G10L 15/183; G10L 15/20; G10L 15/22; G10L 2015/088; G10L 2015/223; G10L 25/78; H04M 1/6041; H04M 3/493; H04M 1/605; H04N 7/147; H04N 7/183; H04N 5/23219; H04N 21/42203; H04N 21/485; H04R 3/04; H04R 2430/01; H04R 2499/15; H04R 29/004; H04R 3/12; H04R 25/40; H03G 3/02; H03G 3/3005; H03G 3/32; H03G 3/341; H03G 9/005; H04S 7/301
USPC ........ 348/158, 77; 381/104, 57, 59, 77, 109; 455/569.1, 418; 704/235, 275, 248; 340/12.22
See application file for complete search history.

(56) References Cited

U.S. PATENT DOCUMENTS

| | | | | |
|---|---|---|---|---|
| 7,424,118 B2* | 9/2008 | Mori | ............. | H04R 3/12 381/104 |
| 8,111,842 B2* | 2/2012 | Seguin | ............. | H03G 9/005 381/104 |
| 8,611,559 B2* | 12/2013 | Sanders | ............. | G06F 3/165 381/104 |
| 9,398,247 B2* | 7/2016 | Tateishi | ............. | H04N 21/42203 |
| 10,074,371 B1* | 9/2018 | Wang | ............. | G10L 15/08 |
| 10,134,425 B1* | 11/2018 | Johnson, Jr. | ............. | G10L 15/05 |
| 10,452,349 B2* | 10/2019 | Kim | ............. | G06F 3/0346 |
| 2002/0095295 A1* | 7/2002 | Cohen | ............. | H04M 3/493 704/275 |
| 2002/0184021 A1* | 12/2002 | Horvitz | ............. | G10L 15/22 704/240 |
| 2006/0050892 A1* | 3/2006 | Song | ............. | H04S 7/301 381/59 |
| 2007/0216538 A1* | 9/2007 | Thelen | ............. | H04N 21/485 381/104 |
| 2010/0054497 A1* | 3/2010 | Bull | ............. | H03G 3/02 381/104 |
| 2010/0250249 A1* | 9/2010 | Fujino | ............. | H04N 7/147 704/235 |
| 2011/0157365 A1* | 6/2011 | Sato | ............. | H04N 7/183 348/158 |
| 2011/0158430 A1* | 6/2011 | Dicks | ............. | H03G 3/341 381/104 |
| 2012/0207329 A1* | 8/2012 | Fried | ............. | H03G 3/32 381/104 |
| 2013/0021459 A1* | 1/2013 | Vasilieff | ............. | G10L 25/78 348/E7.085 |
| 2013/0179168 A1* | 7/2013 | Bae | ............. | H03G 3/3005 704/248 |
| 2014/0135076 A1* | 5/2014 | Lee | ............. | H04M 1/6041 455/569.1 |
| 2016/0277850 A1* | 9/2016 | Li | ............. | H04R 25/40 |
| 2016/0381233 A1* | 12/2016 | Xu | ............. | H04M 1/605 455/418 |
| 2018/0012600 A1* | 1/2018 | Arikawa | ............. | G10L 15/183 |
| 2018/0070008 A1* | 3/2018 | Tyagi | ............. | H04N 5/23219 |
| 2019/0115019 A1* | 4/2019 | Zurek | ............. | G10L 15/22 |
| 2020/0209950 A1* | 7/2020 | Liu | ............. | G06F 3/011 |
| 2020/0374630 A1* | 11/2020 | Liu | ............. | G06F 3/167 |

FOREIGN PATENT DOCUMENTS

| | | |
|---|---|---|
| CN | 104699446 | 6/2015 |
| CN | 104820556 | 8/2015 |
| CN | 105469794 | 4/2016 |
| CN | 105934791 | 9/2016 |
| CN | 106843800 | 6/2017 |
| TW | 201510770 | 3/2015 |

* cited by examiner

HUMAN-MACHINE INTERACTION METHOD AND DEVICE, COMPUTER APPARATUS, AND STORAGE MEDIUM

TECHNICAL FIELD

The present disclosure is directed to human-machine interaction technology, and more particularly, to a method and an apparatus for human-machine interaction, a computer device, and a storage medium.

BACKGROUND

Human-machine interaction refers to use of a certain dialogue language between a person and an apparatus, in a certain way of interaction, to exchange information between the person and the apparatus for completing certain tasks.

With the development of science and technology, application fields of human-machine interaction technology have become wider and wider, ranging from the play button of the radio to the dashboard of the aircraft or the control room of the power plant. Users can communicate with the system and operate through the human-machine interaction interface. At present, in the human-machine interaction technology, the mainstream method for human-machine interaction mainly include three types, the first is a traditional key-press method; the second is a specific voice word activation method, such as, say "Hello, Xiao Bing" before the dialogue, the apparatus recognizes the voice that is heard later; the third is "Raise your hand to speak", that is, a specific gesture action is used to enable the apparatus to start voice recognition.

Although the described human-machine interaction mode can realize the human-machine interaction function to a certain extent, due to the single interaction mode, certain specific gestures need to be set in advance, the interaction process is not very natural, which somewhat brings inconvenience to the operation by the user.

SUMMARY

Accordingly, in view of the above technical problems, it is necessary to provide a method and an apparatus for human-machine interaction, a computer device, and a storage medium that can bring convenience to the user for operation of the human-machine interaction.

A method for human-machine interaction, the method includes:

detecting a current output volume, when the output volume is less than a preset first threshold, starting a voice recognition function;

collecting a user voice message, when a user voice is heard;

detecting a user voice volume and responding to a user voice operation; and when the user voice volume is greater than a preset second threshold, reducing the output volume, and returning to step of detecting the current output volume.

In one of the embodiments, after detecting the current output volume further includes:

when the output volume is greater than the preset first threshold, turning off the voice recognition function.

In one of the embodiments, after detecting the current output volume further includes:

turning off the voice recognition function when a user face is not detected.

In one of the embodiments, when the output volume is less than the preset first threshold, starting the voice recognition function includes:

starting the voice recognition function when the output volume is less than the preset first threshold and a face is detected.

In one of the embodiments, the step of starting the voice recognition function, when the output volume is less than the preset first threshold and the face is detected includes:

when the output volume is less than the preset first threshold, starting a face head pose detection; and when a front face is detected, starting the voice recognition function.

In one of the embodiments, the step of starting the voice recognition function when the output volume is less than the preset first threshold and a face is detected includes:

when the output volume is less than the preset first threshold, acquiring front-view image data of a user in a relative front-view state with an apparatus;

collecting a current image data of the user in real time, and comparing the current collected image data with the front-view image data; and when the current collected image data and the front-view image data are consistent, determining that the user is in the relative front-view state with the apparatus, and starting the voice recognition function.

In one of the embodiments, the responding to the user voice operation includes:

identifying a current playing image type, the image type includes video image, photo image, and voice program;

acquiring a support response instruction word set corresponding to the current playing image type, according to a correspondence relationship between a preset image type and a voice response instruction word;

parsing the user voice message, and acquiring instruction word corresponding to the user voice message;

responding to the user voice operation, when an acquired instruction word belongs to the support response instruction word set corresponding to the current playing image type;

when an acquired instruction word does not belong to the support response instruction word set corresponding to the current playing image type, not responding to the user voice operation.

An apparatus for apparatus for human-machine interaction, the apparatus includes:

an output volume detection module, configured to detect a current output volume, when the output volume is less than a preset first threshold, start a voice recognition function;

a hearing module, configured to collect a user voice message when a user voice is heard;

a response module, configured to detect a user voice volume and respond to a user voice operation; and a volume adjustment module, configured to, when the user voice volume is greater than a preset second threshold, reduce an output volume, and control the output volume detection module to re-perform the operation of detecting the current output volume.

A computer device, including a memory and a processor, the memory having a computer program stored therein which, when executed by the processor, causing the processor to perform steps of the foregoing method.

A computer-readable storage medium on having a computer program stored thereon which, when executed by a processor, causing the processor to perform steps of the foregoing method.

In the described method and apparatus for human-machine interaction, computer device, and storage medium, the current output volume is detected, when the output volume is less than the first preset threshold, the voice recognition function is started, the user voice message is collected, the user voice volume is also detected. In response to operation of the user voice, when a user voice volume is greater than the preset second threshold, the output volume is reduced, and the step of detecting the current output volume is returned to. In the whole process, the activation of voice recognition function is controlled by the output volume of the apparatus itself so as to accurately respond to the user voice operation. When the user voice is greater than a certain value, the output volume is reduced to highlight and accurately collect the user's subsequent voice messages facilitate the operation of the user, which can achieve favorable human-machine interaction.

DETAILED DESCRIPTION OF THE EMBODIMENTS

In order to make purpose, technical solutions and advantages of the present disclosure more clear, the description set forth below further describes the present disclosure in detail with reference to the drawings and embodiments. It should be understood that the specific embodiments described herein are only intended to explain the present disclosure, rather than limit the present disclosure.

Figure 1:
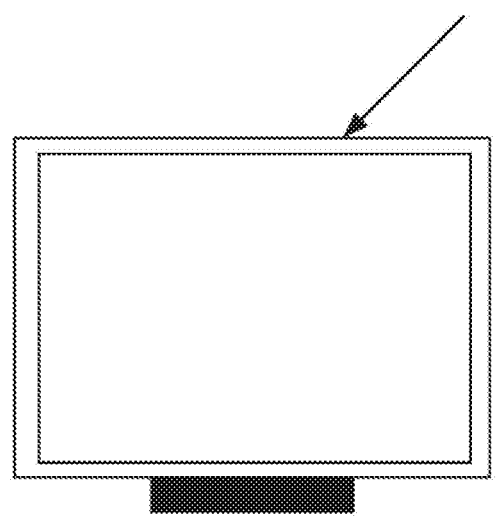
FIG. 1 illustrates schematic diagram of an application environment of a method for human-machine interaction according to an embodiment.
Figure 1:
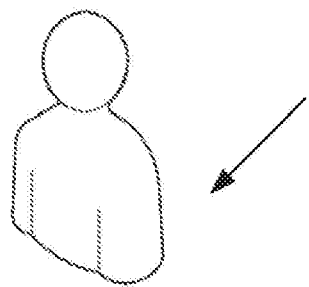

The method for human-machine interaction provided in this disclosure can be applied to the application environment shown in FIG. 1. When the apparatus is running, it detects its own output volume. When the output volume is less than a preset first threshold, it starts its own voice recognition function, such as starting its own built-in voice pickup module, and the user gives a voice message to perform a voice operation. When the apparatus hears the voice message, the apparatus collects the voice message, detects a voice volume, and respond to the user voice operation, such as a switching operation. In addition, the apparatus will also detect whether the user voice volume is greater than a preset value, and when it is greater than the preset value, it reduces its own output volume and returns to the operation of detecting the current output volume.

Figure 2:
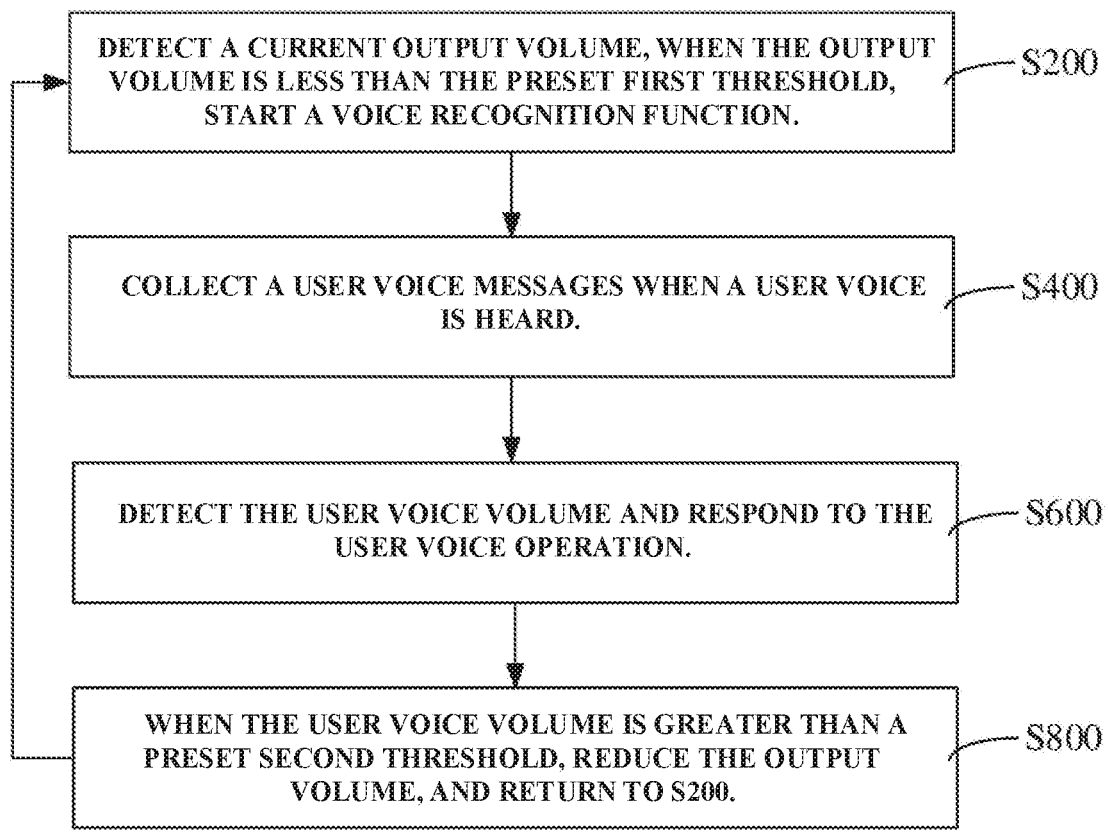
FIG. 2 is a flowchart of a method for human-machine interaction according to an embodiment.

In one of the embodiments, as shown in FIG. 2, a method for human-machine interaction is provided. The method is applied to the device shown in FIG. 1 as an example for illustration, which includes the following step:

S200: detect a current output volume, when the output volume is less than the preset first threshold, start a voice recognition function.

The apparatus detects its current output volume. The detection method can be directly detecting an electrical signal outputted to the sounding device (such as a speaker) in the apparatus. For example, when the apparatus is a TV, a control system in the TV can detect the current electrical signal outputted to the TV speaker to detect the current output volume. The preset first threshold value is a preset threshold value, this value can be set according to actual needs, for example, it can be set to 30 dB, 35 dB, or 40 dB and the like. The voice recognition function refers to a function that can collect and respond to the user voice operation, and its specific activation can be achieved by enabling the voice module or the voice pickup module. In an example the device is a TV, a microphone (or a microphone array), and a sound processing module are built into the TV to pick up the voice of the audience in front of the TV. When the TV output volume is less than the preset first threshold, these built-in hardware devices are started, and the internal control system of the TV enables voice recognition function.

S400: collect user voice messages when a user voice is heard.

After starting the voice recognition function, the apparatus holds the voice hearing state, and collects user voice messages when the user voice is heard. The voice signal outputted by the device itself is known to the apparatus, and the apparatus can subtract (denoise) the known voice signal from the collected voice signal to obtain the current collected user voice message. In an example the apparatus is a TV, the TV holds the voice hearing state after starting the voice recognition function, and when the user voice is heard, the collected voice signal is removed with the voice signal of the TV itself to obtain the user voice message.

S600: detect the user voice volume and respond to the user voice operation.

Based on the collected user voice messages, the user voice volume is detected, and a voice recognition operation is performed in response to the user voice operation. In an example the apparatus is a TV, when the TV hears the user voice of "Next program", it collects the "Next program" voice message of the user, detects that the volume of the voice message gave by the user is 40 dB, and in response to the user voice message, it switches the TV program to the next program. It should be noted that, responding to the user voice operation and detecting the user voice are two parallel actions, the two actions can be implemented in parallel (simultaneously).

S800: when the user voice volume is greater than a preset second threshold, reduce the output volume, and return to the step of detecting the current output volume.

When step S600 detects that a user voice volume is greater than a preset second threshold value, the output volume is reduced, so that a subsequent user voice message can be more timely and accurately heard. The preset second threshold value is a value set in advance, it can be set according to actual needs, for example, 40 dB, 35 dB and the like.

In the described method for human-machine interaction, the current output volume is detected, when the output volume is less than the first preset threshold, the voice recognition function is started, the user voice message is collected, the user voice volume is also detected. In response to operation of the user voice, when a user voice volume is greater than the preset second threshold, the output volume is reduced, and the step of detecting the current output volume is returned to. In the whole process, the activation of voice recognition function is controlled by the output volume of the apparatus itself so as to accurately respond to the user voice operation. When the user voice is greater than a certain value, the output volume is reduced to highlight and accurately collect the user's subsequent voice messages facilitate the operation of the user, which can achieve favorable human-machine interaction.

In one of the embodiments, after detecting the current output volume, the method further includes:

When the output volume is greater than the preset first threshold, turn off the voice recognition function. When the apparatus output volume is greater than the preset first threshold value, the apparatus output sound is large, the user usually has no intent to conduct voice operation, in order to avoid external noise interference, the voice recognition function is turned off, for example, the pickup module in the device can be turned off. In an example the apparatus is a TV, when the TV output volume is greater than the preset first threshold value (40 dB), the TV turns off its built-in pickup module to turn off the voice recognition function and not to respond to voice operations.

In one of the embodiments, turning off the voice recognition function when the output volume is greater than the preset first threshold includes: turning off the voice recognition function when the output volume is greater than the preset first threshold and a user face is not detected.

To avoid that the user cannot perform voice operation in special cases, here, when the apparatus output volume is greater than the preset first threshold value, it further detects whether there is a user face, when there is no user face, it indicates that the current user has no need for voice operation, the voice recognition function is turned off. Optionally, when it is detected that there is a user face, the voice recognition function is not turned off, so that the user can start the voice operation function in an urgency or a sudden. In an example the apparatus is a TV, when the TV detects that the output volume is greater than the preset first threshold, it further detects whether there is a valid and known user face within the current viewing angle range, and when there is no valid and known user face, the voice recognition function is turned off; when there is a valid and known user face, the voice recognition function is not turned off. Optionally, the user face detection can also be performed before the output volume. When no user face is detected, the voice recognition function is directly turned off to avoid the interference of external environment noise, regardless of the output volume.

In one of the embodiments, when the user voice volume is greater than the preset second threshold, the voice recognition function is started to respond to the user voice operation.

In response to the need for voice control in special situations, in the embodiment, when the user voice volume is greater than the preset second threshold, it indicates that the current user urgently needs to perform voice control. Therefore, the voice recognition function is re-started at this time to respond to user voice operation.

In one of the embodiments, when the output volume is less than the preset first threshold, starting the voice recognition function includes: when the output volume is less than the preset first threshold and a face is detected, starting the voice recognition function.

When the output volume is less than the preset first threshold, it is further detected whether there is a face. When there is a face, it indicates that the user has a need for voice operation, and the voice recognition function is started. Optionally, when it is detected that there is no user face, the voice recognition function is not started. In an example the apparatus is a TV, when the TV detects that the output volume is less than the preset first threshold, it further detects whether there is a user face within the viewing angle range, and when a user face is detected, the voice recognition function is started; when no user face is detected, the voice recognition function is not started.

In one of the embodiments, the step when the output volume is less than the preset first threshold and a face is detected, starting the voice recognition function includes: when the output volume is less than the preset first threshold, starting a face head pose detection; when a front face is detected, starting the voice recognition function.

When the output volume is less than the preset first threshold, it is further detected whether there is a user (operator) around the current apparatus. Accordingly, a face head pose detection is performed. When a user front face is detected, the voice recognition function is started. When no user front face is detected, the voice recognition function is not started. In an example the device is a TV, the built-in camera in the TV can detect the position of the face of the audience and provide this face position information to the array pickup module. The pickup module can achieve an accurate voice pickup of the target user at the position, which is beneficial to block other sounds.

In one of the embodiments, when the output volume is less than the preset first threshold and a face is detected, the step of starting the voice recognition function includes: when the output volume is less than the preset first threshold, acquiring a front-view image data of the user in a relative front-view state with the apparatus; collecting the current image data of the user in real time, and comparing the current collected image data with the front-view image data; when the current collected image data and the front-view image data are consistent, determining that the user is in the relative front-view state with the apparatus, and starting the voice recognition function.

When the output volume is less than the preset first threshold, a front-view recognition is started. Specifically, in the front-view recognition process, the apparatus can be a TV, an air conditioner, a computer, or a robot, etc. In addition, the apparatus may also include an in-vehicle apparatus. The user being in a relative front-view state with the apparatus refers to that the user is in a front view to the apparatus, for example, when the apparatus is a TV, the user being in a front-view state with the TV is that the user is in a relative front-view state with the TV. The front-view image data of the user being in the relative front-view with the apparatus can be acquired by an image collection device. Since the image collection device usually cannot be configured in the center of the apparatus, when the image collection device is collecting the image of the user in the relative front-view state with the apparatus, image collection device the eyes or the face of the user are not right opposite to the image collection device from the perspective of the image collection device, a certain angle is typically presented. In order to facilitate subsequent accurate determination of the front-view state, the front-view image data of the user in the relative front-view state with the apparatus collected by the image collection device is acquired first. The front-view image data of the user in the relative front-view state with the apparatus can be the data collected in the historical records or the data collected on spot. The image collection device can be a camera or other devices. Here, the front-view image data of the user in the relative front-view state with the apparatus is collected by the image collection device. The image collection device can be provided on the apparatus, and the image collection device may also be provided on an accessory device or peripheral device of the apparatus. For example, when the apparatus is a TV, the image collection device can be installed on the TV, or can be installed on a set-top box of TV. More specifically, with the front-view image data of the user in the relative front-view state with the apparatus captured by the camera, after image processing and image target coordinate conversion, the relative positions of the apparatus and the user face can be determined, that is, the face image data of the user in the relative front-view state with the apparatus can be acquired. The determination of the user being in the relative front-view state with the apparatus may adopt technologies such as a head pose estimation, or a gaze tracking. On the premise that the user is in the relative front-view state with the apparatus, the behavior and intent of the user are recognized by the visual recognition technology and voice recognition technology of the computer, according to a preset correspondence relationship between user behavior and intent and operation, the apparatus is controlled to perform the operations corresponding to the current behavior and intent of the user. That is, only if the user is in a relatively front-view state with the apparatus, the apparatus will start to respond to user operations. This way, for one thing, erroneous operation can be avoided, for example, the TV can be prevented from starting by mistake, switching TV programs by mistake, etc.; for another thing, when the user is in a relative front-view state with the apparatus, there is a great possibility that the user will operate the apparatus, this brings convenience to the user. Specifically, the visual recognition technology and voice recognition technology of the computer may mainly include face recognition, face detection, face tracking, voice recognition, gesture recognition, lip recognition, voiceprint recognition, expression recognition, age recognition, card recognition, pupil recognition, and iris recognition, etc. The Adoption of the described rich visual recognition technology and voice recognition technology of the computer can implement human-machine interaction from aspects of face, voice, pupil, gesture, etc., which further adds to the life of the user and brings convenience to the user.

In an embodiment, the responding to the user voice operation includes: identifying a current playing image type, the image type includes video image, photo image, and voice program; acquiring a support response instruction word set corresponding to the current playing image type according to a correspondence relationship between a preset image type and a voice response instruction word; parsing the user voice message, and acquiring an instruction word corresponding to the user voice message; responding to the user voice operation, when an acquired instruction word belongs to the support response instruction word set corresponding to the current playing image type; and when an acquired instruction word does not belong to the support response instruction word set corresponding to the current playing image type, not responding to the user voice operation.

The interactive apparatus may include a display apparatus such as a TV, a tablet computer, a notebook computer, and a touch screen, and may also be a robot or a projector. When the display device needs to respond to the user voice operation, the current playing image type is recognized. The image type mainly includes video image, photo image, and voice program. Different image types correspond to different preset voice response instruction words. For example, for video images, there are "fast forward", "backward", "next program", "switch to XX program", etc.; for the photo images, there are "previous", "next", "zoom in", "zoom out", etc. In view of the current playing image type, the corresponding support response instruction words are acquired, the user voice message is parsed, the corresponding instruction word is acquired, when the acquired instruction word belongs to the support response instruction word set corresponding to the current playing image type, respond to the user voice operation, and otherwise no response. Taking the interactive apparatus as a TV as an example, when the TV is now normally playing a TV interface program, the current playing image type is identified as a live TV program in the video image, and the support response instruction words corresponding to the live TV program are "next program", "previous program", and "switch to the XX channel", the user voice message currently acquired is parsed, the instructions words corresponding to the user voice message are "switch to the XX channel", it is determined that "switch to the XX channel" belongs to the current support response instruction words, the user voice operation of "switch to XX channel" is responded to; if the currently acquired user voice message is parsed and the acquired instruction word corresponding to the user voice message is "next", it is determined that "next" does not belong to the current support instruction words, the "next" voice operation of the user is not responded to.

It should be understood that although the steps in the flow charts of FIG. 2 are shown sequentially as indicated by arrows, these steps are not necessarily performed sequentially as indicated by arrows. Unless expressly stated herein, these steps are not implemented in strict order, and they can be executed in other orders. In addition, at least a part of the steps in FIG. 2 may include multiple sub-steps or stages that are not necessarily performed at the same time, but may be performed at different times. The execution sequence of these sub-steps or stages is not necessarily performed in sequence, but may be performed alternately or alternatively with other steps or at least a part of the sub-steps or stages of other steps.

Figure 3:
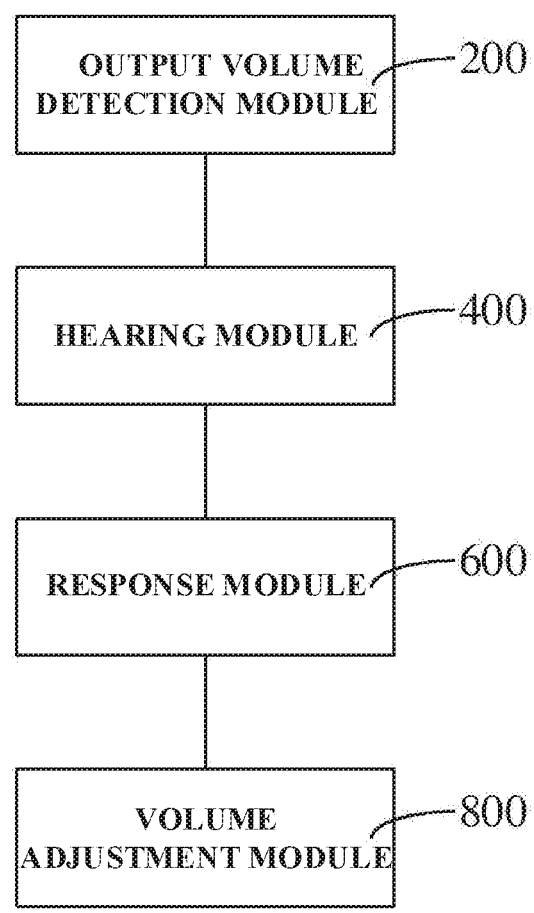
FIG. 3 is a block diagram of apparatus for human-machine interaction according to an embodiment.

As shown in FIG. 3, an apparatus for human-machine interaction includes:

An output volume detection module 200, configured to detect a current output volume, when the output volume is less than a first predetermined threshold, start a voice recognition function;

A hearing module 400, configured to collect a user voice message when a user voice is heard;

A response module 600, configured to detect user voice volume and respond to a user voice operation;

A volume control module 800, configured to, when the user voice volume is greater than a preset second threshold value, reduce the output volume, and control the output volume detection module to re-perform the operation of detecting the current output volume.

In the described apparatus for human-machine interaction, the current output volume is detected, when the output volume is less than the first preset threshold, the voice recognition function is started, the user voice message is collected, the user voice volume is also detected. In response to operation of the user voice, when a user voice volume is greater than the preset second threshold, the output volume is reduced, and the step of detecting the current output volume is returned to. In the whole process, the activation of voice recognition function is controlled by the output volume of the apparatus itself so as to accurately respond to the user voice operation. When the user voice is greater than a certain value, the output volume is reduced to highlight and accurately collect the user's subsequent voice messages facilitate the operation of the user, which can achieve favorable human-machine interaction.

In an embodiment, the output volume detection module 200 is further configured to turn off the voice recognition function when the output volume is greater than the preset first threshold.

In an embodiment, the output volume of the detection module 200 is further configured to turn off the voice recognition function when the output volume is greater than the first preset threshold value and not user face is detected.

In an embodiment, the output volume of the detection module 200 is further configured to start the voice recognition function when the output volume is less than the preset first threshold and a face is detected.

In an embodiment, the output volume detection module 200 is further configured to, when the output volume is less than the preset first threshold, start a face head pose detection; and when a front face is detected, start the voice recognition function.

In an embodiment, the output volume detector module 200 is further configured to when the output volume is less than the preset first threshold, acquire front-view image data of a user in a relative front-view state with an apparatus; collect a current image data of the user in real time, and compare the current collected image data with the front-view image data; and when the current collected image data and the front-view image data are consistent, determine that the user is in the relative front-view state with the apparatus, and start the voice recognition function.

In an embodiment, the response module 600 is further configured to identify a current playing image type, the image type includes video image, photo image, and voice program; acquire a support response instruction word set corresponding to the current playing image type according to a correspondence relationship between a preset image type and a voice response instruction word; parse the user voice message, and acquire an instruction word corresponding to the user voice message; respond to the user voice operation, when an acquired instruction word belongs to the support response instruction word set corresponding to the current playing image type; and when an acquired instruction word does not belong to the support response instruction word set corresponding to the current playing image type, not responding to the user voice operation.

For specific definition of the apparatus for human-machine interaction, reference can be made to the definition of the method for human-machine interaction above, which will not be repeated here. Each module in the above apparatus for human-machine interaction can be implemented in whole or in part by software, hardware, or a combination thereof. The above modules can be embedded in or independent from the processor in the computer device in the form of hardware, or can be stored in the memory in the computer device in the form of software, so that the processor can call and execute the operations corresponding to the above modules.

Figure 4:
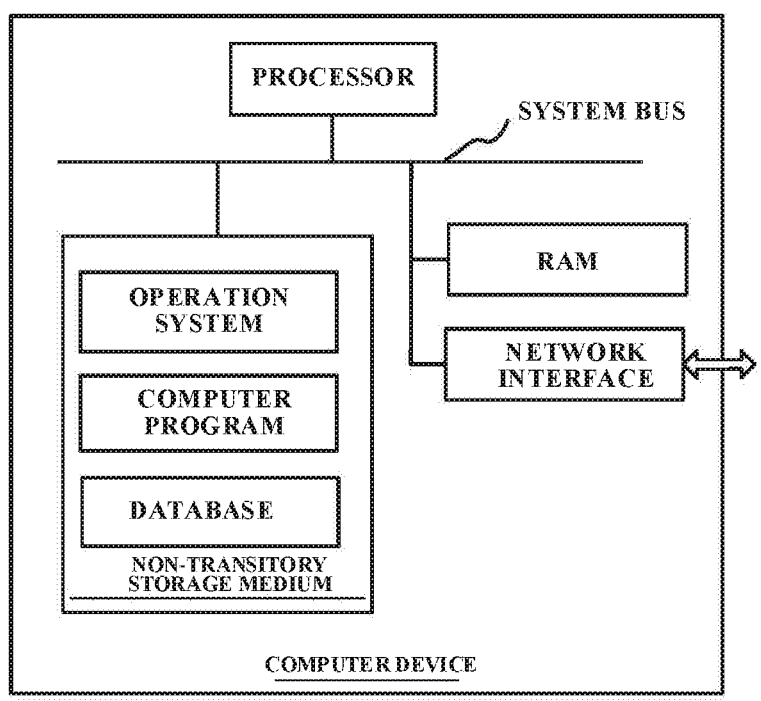
FIG. 4 is a schematic diagram of an internal configuration of a computer device according to an embodiment.

In an embodiment, a computer device is provided. The computer device can be a server, and its internal structure can be as shown in FIG. 4. The computer device includes a processor, a memory, a network interface, and a database connected by a system bus. The processor of the computer device is configured to provide computing and control capabilities. The memory of the computer device includes a non-transitory storage medium, and a Random Access Memory (RAM). The non-transitory storage medium stores an operating system, a computer program, and a database. The RAM provides an environment for the operation of the operating system and the computer program in the non-transitory storage medium. The database of the computer device is configured to store preset data. The network interface of the computer device is configured to communicate with external terminals by network connection. When the computer program is executed by the processor, a method for human-machine interaction is implemented.

Those skilled in the art can understand that the structure shown in FIG. 4 is only a block diagram of part of the structure related to the solution of the present disclosure, and it does not constitute a limitation on the computer device to which the solution of this disclosure is applied. The specific computer device may include more or fewer components than shown in the drawings, or combine certain components, or have different component arrangements.

In an embodiment, a computer device is provided, including a memory, a processor, and a computer program stored on the memory and executable on the processor. When the processor executes the computer program, the following steps are implemented:

detecting a current output volume, when the output volume being less than a preset first threshold, starting a voice recognition function;

collecting a user voice message when a user voice being heard;

detecting a user voice volume and responding to a user voice operation; and when the user voice volume being greater than a preset second threshold, reducing the output volume, and returning to step of detecting the current output volume.

In one of the embodiments, the processor also executes the computer program to provide: turning off the voice recognition function when the output volume being greater than the preset first threshold.

In one of the embodiments, the processor also executes the computer program to provide: when the output volume is greater than the preset first threshold and no user face is detected, the voice recognition function is turned off.

In one of the embodiments, the processor also executes the computer program to provide: starting the voice recognition function when the output volume is less than the preset first threshold and a face is detected.

In one of the embodiments, the processor also executes the computer program to provide: when the output volume is less than the preset first threshold, starting a face head pose detection; and when a front face is detected, starting the voice recognition function.

In one of the embodiments, the processor also executes the computer program to provide: when the output volume is less than the preset first threshold, acquiring front-view image data of a user in a relative front-view state with an apparatus; collecting a current image data of the user in real time, and comparing the current collected image data with the front-view image data; and when the current collected image data and the front-view image data are consistent, determining that the user is in the relative front-view state with the apparatus, and starting the voice recognition function.

In one of the embodiments, the processor also executes the computer program to provide: identifying a current playing image type, the image type includes video image, photo image, and voice program; acquiring a support response instruction word set corresponding to the current playing image type according to a correspondence relationship between a preset image type and a voice response instruction word; parsing the user voice message, and acquiring an instruction word corresponding to the user voice message; responding to the user voice operation, when an acquired instruction word belongs to the support response instruction word set corresponding to the current playing image type; and when an acquired instruction word does not belong to the support response instruction word set corresponding to the current playing image type, not responding to the user voice operation.

In an embodiment, a computer-readable storage medium is provided on which a computer program is stored, and when the computer program is executed by a processor, the following steps are implemented:

detecting a current output volume, when the output volume being less than a preset first threshold, starting a voice recognition function;

collecting a user voice message when a user voice being heard;

detecting a user voice volume and responding to a user voice operation; and when the user voice volume being greater than a preset second threshold, reducing the output volume, and returning to step of detecting the current output volume.

In one of the embodiments, the processor also executes the computer program to provide: turning off the voice recognition function when the output volume being greater than the preset first threshold.

In one of the embodiments, the processor also executes the computer program to provide: when the output volume is greater than the preset first threshold and no user face is detected, the voice recognition function is turned off.

In one of the embodiments, the processor also executes the computer program to provide: starting the voice recognition function when the output volume is less than the preset first threshold and a face is detected.

In one of the embodiments, the processor also executes the computer program to provide: when the output volume is less than the preset first threshold, starting a face head pose detection; and when a front face is detected, starting the voice recognition function.

In one of the embodiments, the processor also executes the computer program to provide: when the output volume is less than the preset first threshold, acquiring front-view image data of a user in a relative front-view state with an apparatus; collecting a current image data of the user in real time, and comparing the current collected image data with the front-view image data; and when the current collected image data and the front-view image data are consistent, determining that the user is in the relative front-view state with the apparatus, and starting the voice recognition function.

In one of the embodiments, the processor also executes the computer program to provide: identifying a current playing image type, the image type includes video image, photo image, and voice program; acquiring a support response instruction word set corresponding to the current playing image type according to a correspondence relationship between a preset image type and a voice response instruction word; parsing the user voice message, and acquiring an instruction word corresponding to the user voice message; responding to the user voice operation, when an acquired instruction word belongs to the support response instruction word set corresponding to the current playing image type; and when an acquired instruction word does not belong to the support response instruction word set corresponding to the current playing image type, not responding to the user voice operation.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for human-machine interaction, comprising:
    detecting a current output volume, when the output volume being less than a preset first threshold, starting a voice recognition function;
    collecting a user voice message when a user voice being heard;
    detecting a user voice volume and responding to a user voice operation; and
    when the user voice volume being greater than a preset second threshold, reducing the output volume, and returning to step of detecting the current output volume;
    wherein when the output volume is less than the preset first threshold, starting the voice recognition function comprising:
    starting the voice recognition function when the output volume is less than the preset first threshold and a face is detected;
    wherein the step of starting the voice recognition function when the output volume is less than the preset first threshold and the face is detected comprising:
    when the output volume is less than the preset first threshold, starting a face head pose detection; and
    when a front face is detected, starting the voice recognition function.

2. The method according to claim 1, wherein after detecting the current output volume, the method further comprising:
    turning off the voice recognition function when the output volume being greater than the preset first threshold.

3. The method according to claim 2, wherein after detecting the current output volume, the method further comprising:
    turning off the voice recognition function when a user face being not detected.

4. The method according to claim 1, wherein the step of starting the voice recognition function when the output volume is less than the preset first threshold and a face is detected comprising:
- when the output volume is less than the preset first threshold, acquiring front-view image data of a user in a relative front-view state with an apparatus;
- collecting a current image data of the user in real time, and comparing the current collected image data with the front-view image data; and
- when the current collected image data and the front-view image data are consistent, determining that the user is in the relative front-view state with the apparatus, and starting the voice recognition function.

5. The method according to claim 1, wherein the responding to the user voice operation comprising:
- identifying a current playing image type, the image type comprising video image, photo image, and voice program;
- acquiring a support response instruction word set corresponding to the current playing image type according to a correspondence relationship between a preset image type and a voice response instruction word;
- parsing the user voice message, and acquiring an instruction word corresponding to the user voice message;
- responding to the user voice operation, when an acquired instruction word belongs to the support response instruction word set corresponding to the current playing image type; and
- when an acquired instruction word does not belong to the support response instruction word set corresponding to the current playing image type, not responding to the user voice operation.

6. A computer device, comprising a memory and a processor, the memory having a computer program stored therein which, when executed by the processor, causing the processor to perform;
- detecting a current output volume, when the output volume being less than a preset first threshold, starting a voice recognition function;
- collecting a user voice message when a user voice being heard;
- detecting a user voice volume and responding to a user voice operation; and
- when the user voice volume being greater than a preset second threshold, reducing the output volume, and returning to step of detecting the current output volume;
- wherein the processor further executes the program to perform:
- starting the voice recognition function when the output volume is less than the preset first threshold and a face is detected;
- wherein the processor further executes the program to perform:
- when the output volume is less than the preset first threshold, starting a face head pose detection; and
- when a front face is detected, starting the voice recognition function.

7. The computer device according to claim 6, wherein after detecting the current output volume, the processor further executes the program to perform:
- turning off the voice recognition function when the output volume being greater than the preset first threshold.

8. The computer device according to claim 7, wherein after detecting the current output volume, the processor further executes the program to perform:
- turning off the voice recognition function when a user face being not detected.

9. The computer device according to claim 6, wherein the processor further executes the program to perform:
- when the output volume is less than the preset first threshold, acquiring front-view image data of a user in a relative front-view state with an apparatus;
- collecting a current image data of the user in real time, and comparing the current collected image data with the front-view image data; and
- when the current collected image data and the front-view image data are consistent, determining that the user is in the relative front-view state with the apparatus, and starting the voice recognition function.

10. The computer device according to claim 6, wherein the processor further executes the program to perform:
- identifying a current playing image type, the image type comprising video image, photo image, and voice program;
- acquiring a support response instruction word set corresponding to the current playing image type according to a correspondence relationship between a preset image type and a voice response instruction word;
- parsing the user voice message, and acquiring an instruction word corresponding to the user voice message;
- responding to the user voice operation, when an acquired instruction word belongs to the support response instruction word set corresponding to the current playing image type; and
- when an acquired instruction word does not belong to the support response instruction word set corresponding to the current playing image type, not responding to the user voice operation.

11. A computer-readable storage medium having a computer program stored thereon which, when executed by a processor, causing the processor to perform;
- detecting a current output volume, when the output volume being less than a preset first threshold, starting a voice recognition function;
- collecting a user voice message when a user voice being heard;
- detecting a user voice volume and responding to a user voice operation; and
- when the user voice volume being greater than a preset second threshold, reducing the output volume, and returning to step of detecting the current output volume;
- wherein the processor further executes the program to perform:
- starting the voice recognition function when the output volume is less than the preset first threshold and a face is detected;
- wherein the processor further executes the program to perform:
- when the output volume is less than the preset first threshold, starting a face head pose detection; and
- when a front face is detected, starting the voice recognition function.

12. The storage medium according to claim 11, wherein after detecting the current output volume, the processor further executes the program to perform:
- turning off the voice recognition function when the output volume being greater than the preset first threshold.

13. The storage medium according to claim 12, wherein after detecting the current output volume, the processor further executes the program to perform:

turning off the voice recognition function when a user face being not detected.

14. The storage medium according to claim 11, wherein the processor further executes the program to perform:
when the output volume is less than the preset first threshold, acquiring front-view image data of a user in a relative front-view state with an apparatus;
collecting a current image data of the user in real time, and comparing the current collected image data with the front-view image data; and
when the current collected image data and the front-view image data are consistent, determining that the user is in the relative front-view state with the apparatus, and starting the voice recognition function.

* * * * *